Patented Feb. 16, 1937

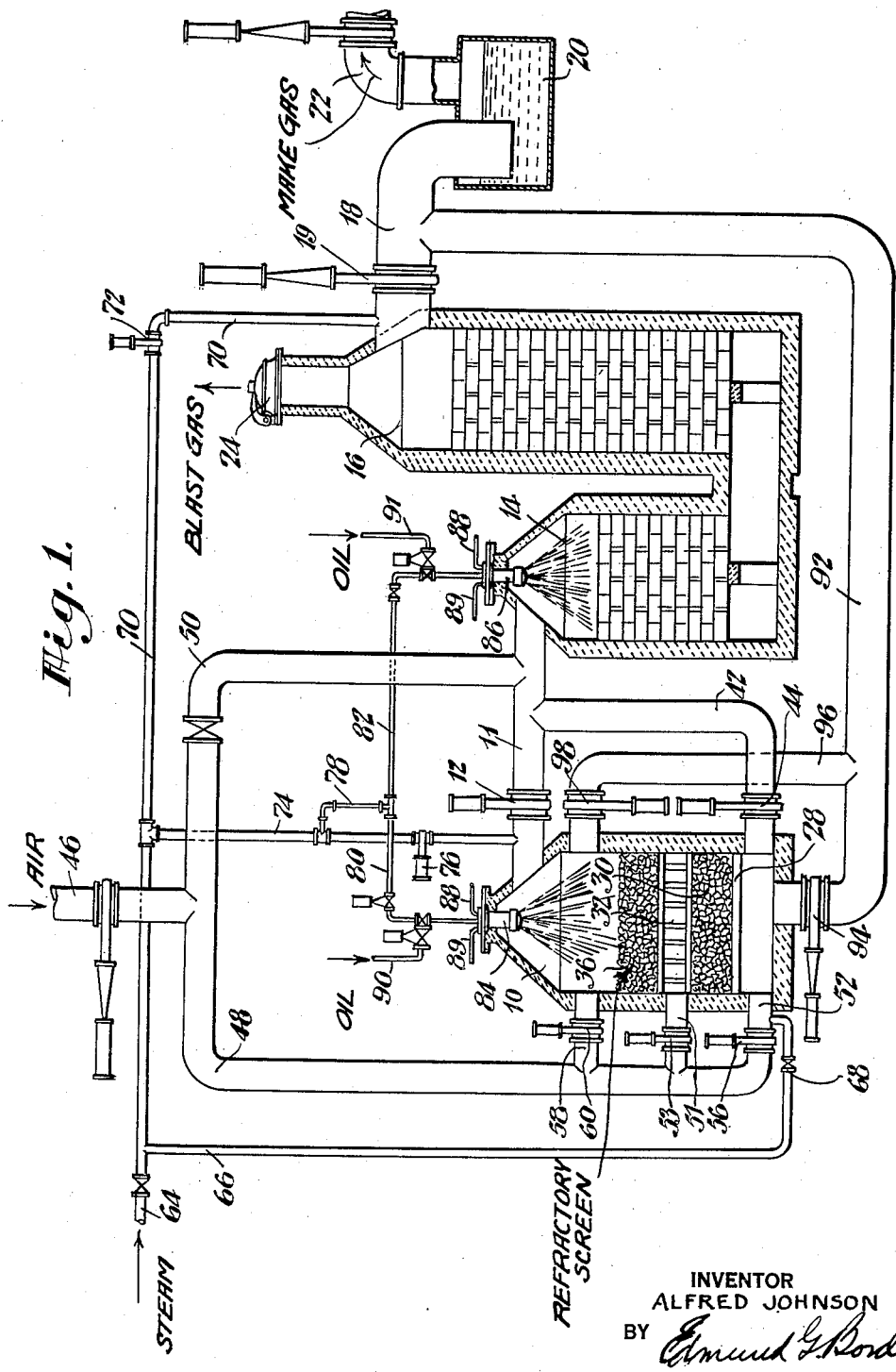

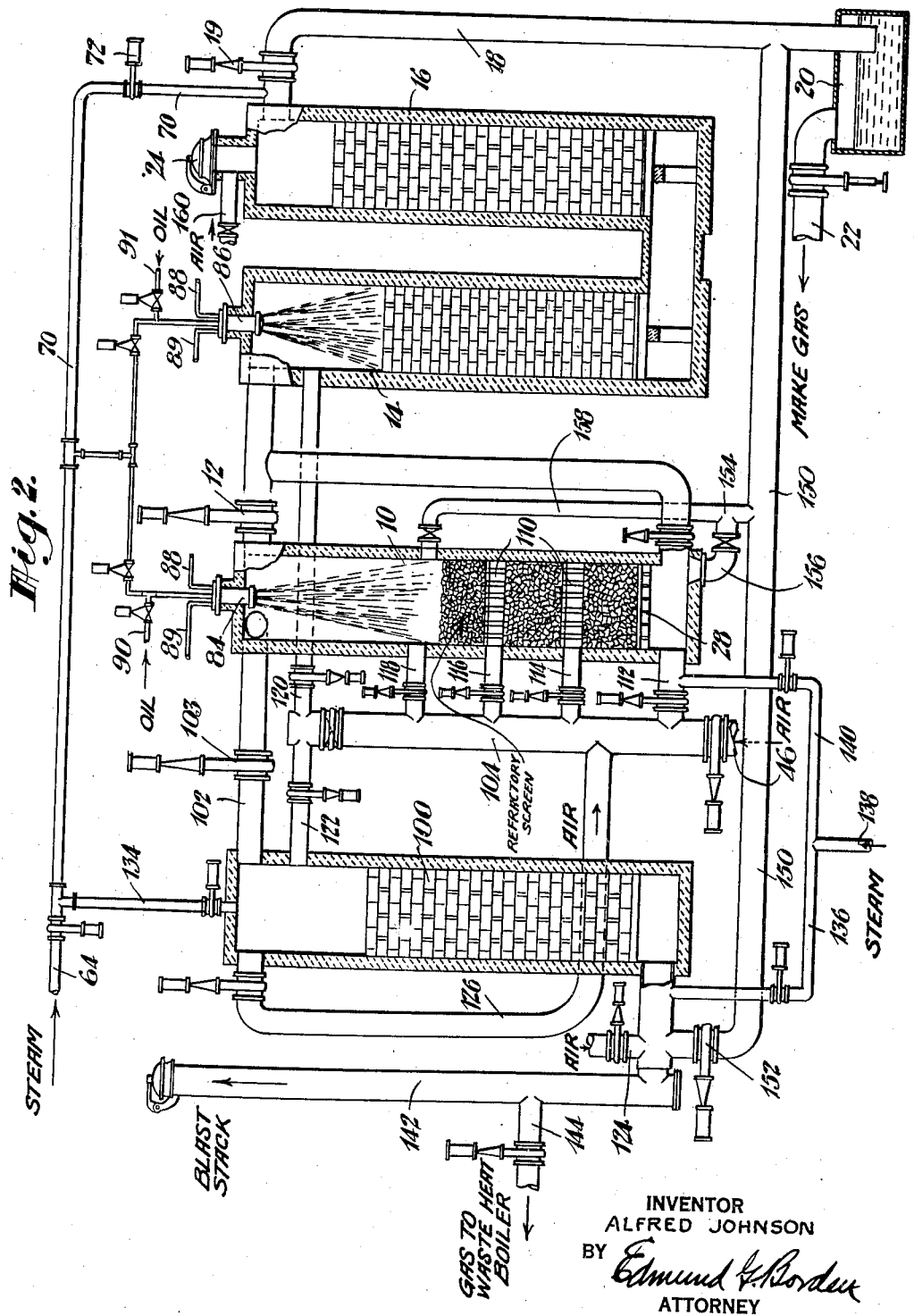

2,071,285

UNITED STATES PATENT OFFICE 2,071,285

OIL GASIFICATION PROCESS AND APPARATUS

Alfred Johnson, West New Brighton, N. Y., assignor to Combustion Utilities Corporation, New York, N. Y., a corporation of Maine Application December 26, 1931, Serial No. 583,260

7 Claims. (Cl. 48—214)

This invention concerns oil gasification, and it relates more particularly to a process and apparatus for the production from hydrocarbon mixtures of a combustible gas of preselected heating value and specific gravity adapted for the usual industrial and domestic purposes. The invention herein described is a continuation in part of that described in my co-pending application Serial No. 561,354, filed September 5th, 1931, and now Patent No. 2,042,997.

Processes are now known by which mixtures of oil gas and water gas are produced by cyclic processes involving the step of spraying oil and steam upon a highly heated bed of solid coke in a gas generator. Such processes are extremely difficult to control, both with respect to the maximum temperature obtained in the fuel bed and the degree of uniformity of heat distribution therethrough. Extremely high temperatures are developed within the latter, which not only injures the refractory walls of the generator, but also causes excessive clinker formation. This seriously interferes with the maintenance of the temperatures most suitable for oil gasification and makes necessary frequent shut-downs in order to permit removal from the generator of the mass of clinkers. Furthermore the oil forms a dense cake upon the porous coke and reduces the porosity of the latter so that the gas making cycles are of shorter duration than would otherwise be the case.

To avoid the very many difficulties attendant the production of oil gas by spraying the oil upon a coke fuel bed, attempts have in the past been made to substitute for the latter a checker brick construction of refractory brick, upon which oil is sprayed during the make run. For heating this mass of refractory to a sufficiently high temperature, oil or gas has been burned in contact with the refractory mass during a separate heating step. This is not only a wasteful use of the hydrocarbon, but furthermore, when attempts have been made to heat the refractory checker brick of the generator by the usual simple upward blasting of air therethrough, the effect has been to rapidly consume the carbon from the lower portion of the refractory mass, following which this portion of the refractory bed is rapidly cooled by the remaining air to below the lowest temperatures at which it can function as an oil decomposing medium. This cool zone rapidly progresses upwardly within the refractory bed as the air flow continues, and the apparatus then ceases to function.

Among the more important objects of the present invention are to provide in a novel manner for the manufacture of a combustible gas from oil, supplying all of the heat requirements of the process by the controlled combustion within a refractory bed or screen of carbon produced by decomposition of the oil employed, and to provide in a novel manner for the production of a combustible gas in which all of the heat required is generated during a blast cycle from carbon produced in an earlier gas-making cycle.

The invention in its broadest scope includes the step of blasting air or its equivalent through beds or screens of suitably-sized refractory bodies within a gas generator, under conditions selected effectively to consume the carbon deposited upon and in the said beds during a previous gas-making run. Portions of the heat thus developed are utilized for heating the carbureter and superheater subsequently employed for the carburetion of the resultant oil gas or mixed oil gas, water gas,—and for superheating steam and/or air used in subsequent cycles.

The present invention is based upon the discovery that it is possible to recover upon a highly heated refractory screen or a series of vertically-spaced refractory screens within a generator, sufficient carbon formed by the decomposition of a hydrocarbon oil and/or gas in the generator to supply all of the heat requirements for gasification of the oil and to maintain the entire refractory screen or each of the screens at suitable gas-making temperatures. This is accomplished by dividing the air employed for blasting into a plurality of portions, and introducing each of the said portions into the refractory screen or screens of the generator at an elevation substantially above the point of introduction of the immediately preceding portion.

Because of the high temperature heat control of the refractory bed possible by use of the progressive blast cycle here described, there is a much larger amount and more uniform distribution of carbon deposited in the refractory screen than is possible when employing the usual single up-blast cycle directed through the full depth of a refractory bed.

The blasting operation is begun by introducing air below the grate, preferably in approximately sufficient amount to consume the amount of carbon lying in the lowermost screen or in the portion of the screen between the grate and the air blast inlet next above it. When the carbon in this lower portion of the screen has been consumed,—(as indicated for example by the temperature of a thermocouple located in that portion of the screen),—this portion of the primary blast is discontinued and another selected portion of blast air is introduced into the generator screen through the air inlet next above the grate, and the remaining carbon in that portion of the screen is thus consumed, with the generation of heat. Thus there is effected an even distribution of heat through the successive zones above each blast air inlet, and the entire screen is placed in the temperature equilibrium most effective for cracking of hydrocarbons in the gas or vapor phase.

In accordance with the usual practice of the invention, any carbon in the refractory screens that is not utilized in the blast cycle for heating purposes is reacted with small amounts of steam introduced during the gas-making run,—with the production of blue water gas.

In the accompanying drawings which illustrate apparatus embodying features of the present invention, Fig. 1 shows somewhat diagrammatically in vertical section a modified form of standard water gas set embodying features of the invention; and Fig. 2 is a similar view of a second modification of apparatus embodying the invention.

Referring to Fig. 1, numeral 10 designates a gas generator of standard type, in communication successively through conduit 11 controlled by valve 12 with a carburetter 14, superheater 16 and thence through conduit 18 controlled by valve 19, with a wash box 20. A valve controlled gas off-take 22 leads from the latter. The top of the superheater is connected through stack valve 24 with a stack,—or with a waste heat boiler or other heat regenerator.

The generator 10 has therein a grate 28 on which is supported a bed or screen 30 of refractory bodies, which screen may vary in thickness from one foot upwardly, depending upon such factors as the temperature to be maintained therein, the composition of the oil being gasified, and the size and composition of the refractory bodies employed,—especially of those in the upper portions of the refractory bed. Immediately above the layer 30 of the refractory body is an open checkerbrick passageway 32 extending across the generator and permitting free communication between the gases in the upper and lower parts of the generator. There may be substituted for the grate a refractory arch or a checkerbrick supporting structure for supporting the refractory screen.

Supported upon the upper part of the checker-brick 32 is a second similar bed or screen of refractory bodies 36, preferably of somewhat larger size than those employed in the lowermost refractory screen 30.

While the size and shape of the refractory bodies employed in the respective screens may vary somewhat, yet satisfactory results have been obtained employing a thickness of 2½ feet of refractory bodies of size approximately 1½" x 1½" x 1¼" for the bed 30 and employing approximately at 2½ feet thickness of either the same size or somewhat larger refractory bodies for the bed 36. Refractory bodies of approximately uniform size,—as small as ¾" x ¾" x ¾", and as large as 1½" x 1½" x 1½",—have been successfully used in the process.

Since temperatures as high as 2600° to 3000° F. are sometimes developed in the refractory bed, the material composing the refractory screen preferably is of highly heat-refractory material. High alumina bricks such as alusite (which is a 60%–70% aluminum oxide refractory having a low iron content and embodying a coarsely ground aggregate burned to a high temperature) are suitable, as are refractories made from carborundum, high silica brick and pure alundum which are adapted to resist temperatures well above 3000° F. for very long periods of time.

The lower part of the generator 10 below the grate is connected directly with the carburetter through a line 42 controlled by a valve 44.

For introducing air for combustion into the generator and carbureter, a valve-controlled main air header 46 is provided, having the respective branch lines 48 and 50. The branch line 48 communicates with the generator below the grate through conduit 52 under control of a valve 56. It also communicates with the generator between the respective refractory screens 30 and 36 through branch 51 controlled by valve 53,—and above the top of the refractory screen 36 therein through the conduit 58 controlled by valve 60. The valve-controlled branch air line 50 communicates directly with the carbureter 14.

For the purpose of supplying steam to the various elements of the gas-making set, there is provided a valve controlled steam line 64 having a branch line 66 controlled by a valve 68 and a branch line 70 controlled by a valve 72. Line 66 communicates directly with the generator below the grate; and the steam line 70 leads to the upper end of superheater 16.

A branch steam line 74 controlled by valve 76 conducts steam from the main header 64 to the upper part of the generator. A smaller steam line 78 connects the line 74 through the valve-controlled branch lines 80 and 82 respectively with an oil spray nozzle 84 in the generator, and with an oil spray nozzle 86 in the carbureter. Each of the said spray nozzles preferably is provided with a cooling jacket, and with means including inlet and outlet lines 88 and 89, for circulating a cooling fluid around each nozzle. Valve-controlled oil lines 90 and 91 respectively communicate with the spray nozzles 84 and 86.

A rich gas off-take 92 controlled by valve 94 connects the lower part of the generator below the grate with the conduit 18 adjacent the wash box. A branch rich gas offtake 96 controlled by valve 98 connects the offtake line 92 with the generator 10 above the top of the uppermost refractory screen.

The modification of the invention illustrated in Fig. 2 is adapted for the utilization of regenerated heat for preheating air and superheating steam used in the process. The generator and carbureter are somewhat taller than in the corresponding units shown in Fig. 1. The features of construction shown in Fig. 2 are in many respects similar to those of Fig. 1. As illustrated, there is superposed three independent beds or screens of refractory bodies of the type hereinbefore described, the lowermost one of which is supported upon the grate 28. Each of the higher beds is supported on a checker-brick construction 110 similar to the checker-brick 32 of Fig. 1.

In Fig. 2, the upper end of the generator 10 is in controlled communication with a regenerator 100 through a conduit 102 controlled by a valve 103, which conduit preferably opens tangentially into the generator in the manner shown.

The main air line 46 is connected through a distributing header 104 with a valve-controlled conduit 112 leading to the generator below the grate. Respective valve-controlled conduits 114 and 116 connect the header 104 with the respective checker-brick supporting members 110, 110. A valve-controlled conduit 118 leads from header 104 to the generator above the uppermost refractory screen. Valve-controlled lines 120 and 122 respectively permit controlled communication between header 104 and the upper part of the carbureter 14, and between the header 104 and the regenerator 100.

A valve-controlled air conduit 124 conducts air to the regenerator 100 opposite the generator. A valve-controlled air by-pass conduit 126 directly connects the upper end of the regenerator 100 with the air distributing header 104.

A valve-controlled branch steam line 134 leads to the top of the regenerator 100. Valve-controlled branch lines 136 and 140 respectively lead from a steam header 138 to the base of the regenerator 100, and to the base of the generator 10. The lower part of the regenerator 100 is connected with a stack 142 or, through a valve-controlled line 144, with a waste heat boiler or the like.

A rich gas off-take 150 controlled by a valve 152 establishes controlled communication between the base of regenerator 100 and the wash box 20. A short gas offtake pipe 154 directly connects the offtake line 150 with the generator at points respectively below the grate and above the uppermost refractory screen, through the valve-controlled lines 156, 158. Other elements of construction are similar to those of Fig. 1.

In the practice of the invention with the apparatus shown in Fig. 1, the following series of steps is preferably employed. Assuming that an oil gas-making cycle has been completed and that the refractory screens 30, 36 now contain a substantial quantity of carbon deposited in and on them, the necessary valves are adjusted to produce a flow of air alone, or of air more or less saturated with steam, into the base of the generator through conduit 52. The air in passing up through the highly-heated refractory screen 30 reacts with the carbon held by the latter, thus producing blast gases, the carbon dioxide content of which is reduced to carbon monoxide during passage through the screen, so that the first portion of the blast gases leaving the uppermost refractory screen is relatively rich in carbon monoxide. The higher the blasting rates employed, the poorer will be the blast products. The amount of carbon held by the screen 30 at the beginning of the blasting operation may be adjusted by properly correlating the grade of hydrocarbon oil employed in the generator, the size of refractory bodies in the respective beds 36 and 30, the thickness of the beds, and the temperatures maintained therein.

After the blast through conduit 52 has proceeded long enough to consume the carbon in the lower portion of the refractory screen 30, thereby raising it to a high gas-making temperature, preferably within the range from 1900° F. to 2300° F. or thereabove, the blast of air through the refractory bed 30 is discontinued,—and air is blasted into the space immediately below the refractory fuel bed 36, the latter of which contains a substantially larger amount of carbon than does refractory screen 30. This air blast causes the combustion of all or a major part of the carbon remaining in the refractory screen 36,—the latter of which has been already highly heated by the hot combustion gases flowing therethrough from the lower refractory screen 30.

During each stage of the blast cycle described, controlled amounts of secondary air are introduced into the generator above the refractory bed through conduit 58, for burning selected portions of the blast gases within the upper part of the generator; and heat thus produced is stored in the upper generator walls. The blast products flow from the generator and are more or less completely burned in the carbureter by secondary air introduced therein from line 50. The resultant sensible heat serves to highly heat the carbureter and superheater, from the latter of which blast gases flow to the stack or to a waste heat boiler as in the usual practice. After the various refractory screens in the generator have been successively heated to a suitable gas-making temperature, the air supply to the generator is discontinued, and a short down steam purge is effected in the generator by steam introduced therein through the steam line 74,—valve 12 being closed and the valve 44 open.

The apparatus is now ready for the gas-making run,—the refractory bodies in the various generator screens and the checker-brick of the carbureter and superheater being at high temperatures. Hydrocarbon oil, with or without a small amount of steam and/or gaseous hydrocarbon, is now introduced into the generator through the nozzle 84,—supplemented if desired by additional steam flowing thereto through steam line 74. The nozzle 84 effects a thorough distribution of the oil upon the upper surface of the refractory screen 36 where rapid thermal decomposition of the oil begins and is continued in its downward flow through the generator. Part of the carbon thus formed is in the form of a lamp black-like material, and part is of a pitchy or coke-like nature. Considerable carbon is evidently caught by the refractory screens through a form of mechanical filtration although, on the whole, filtration appears to be a less important factor than is that of the temperature of the respective refractory screens and checker-brick in determining disposition and amount of the carbon within the generator. Cracking of oil vapors is largely a surface reaction; and it is therefore important that the refractory filling of the generator be designed to permit the formation and retention of ample carbon in the lower-most refractory screen 30, to heat it to temperautres above 1800° F. during the subsequent blast cycle. The flow of primary air to the screen 30 should be discontinued when the carbon in that screen has been fully or in major part consumed, after which the blast air is introduced into the generator above this screen.

The hydrocarbon gases,—containing some water gas when steam is introduced into the generator with the oil,—flow through conduit 42 to the carbureter where they encounter a spray of hydrocarbon oil; and the resultant carbureted gases are then fixed in the highly-heated carbureter and superheater. From the latter they flow to the wash box through conduit 18.

The oil introduced into the carbureter through the nozzle 86 is preferably of a lower gravity than that employed in the generator. Gas oil may be effectively used in both the generator and carbureter, although it is preferred to use in the former a heavier oil, such as one having an A. P. I. gravity of 12° to 18½°. Hydrocarbon oils of the gravity of fuel oil or still heavier hydrocarbons are adapted for use in the generator, as also are lighter hydrocarbons such as refinery gas and natural gas, alone or with oils.

Following completion of the downrun gas-making cycle, a short up-purge with steam is employed, the latter being introduced below the grate of the generator through conduit 66. The purge gases are conducted to the gas main through the carbureter and superheater. The above-mentioned series of cycles is then repeated.

In cases where it is desired to use the generator without the carbureter and superheater,—the operation is the same as described above, except that the blast gases leaving the generator may be passed directly to a waste heat boiler or the like for heat regeneration, and the combustible gases produced in the gas-making cycle are conducted directly from the generator to the holder through conduit 92.

The efficiency of the conversion of oil to form oil gas depends to considerable degree upon such factors as the character and gravity of the oil employed, the temperature of the refractory screens, and the time of contact of the oil vapors with the highly-heated refractory bodies of each screen. The temperature in the lowermost refractory screen preferably should be maintained at 2000° F. or above.

It is sometimes desired to compensate for the use of a hydrocarbon oil of low carbon content by increasing the length of time of contact and the intimacy of contact of the hydrocarbons and the highly heated refractory bodies. In such instances the cycle of operations above described will be employed, modified however in the following manner. Very little or no steam is admitted with the oil in the generator during the gas-making cycle, thereby serving to reduce the volume of vapors and gases formed and reducing the velocity of such gases and vapors through the hot refractory screens. The oil gases produced by the decomposition of the hydrocarbon vapors flow from the generator through the carbureter and superheater to the wash box. No carbureting oil is employed in the generator during this stage of the gas-making cycle. After the temperature of the refractory screens has been lowered to a point where the gasification of oil rapidly falls off, the oil to the generator is cut off and valves 44 and 12 are reversed, and steam is introduced into the generator through line 66. The blue gas thus produced by reaction with the remaining highly heated carbon in the generator is carbureted by a spray of oil introduced into the carbureter through the nozzle 86, and the resultant carbureted gas is conducted through the superheater to the wash box.

Where steam is used in conjunction with oil in the generator, the relative proportions of each is so selected as to produce a rate of gas flow through the refractory screens below the critical velocity at which the refractory screens cause insufficient oil decomposition to yield enough carbon for bringing the refractory screens up to gas-making temperatures during the subsequent blast operation.

In the preferred practice of the invention employing apparatus of the nature shown in Fig. 2, the series of cycles is in general the same as that above described, with the exception of the blast cycle. With respect to the latter, air is introduced successively into the generator below the respective refractory screens in the manner described in connection with the operation of the generator shown in Fig. 1. The blast gases leaving the uppermost refractory screen at the beginning of the blast cycle preferably are conducted through either the regenerator 100, or through the carbureter and superheater, to the wash box and storage. If desired, the blast gases may be split,—part thereof being conveyed through the generator and the balance conducted through the carbureter and superheater.

As the blast cycle continues, the blast gases become progressively leaner. Those produced after the early part of the blasting operation are divided, and portions respectively introduced into the regenerator and the carbureter are burned therein by secondary air introduced through the lines 120 and 122. The resultant combustion gases are conducted away through the stack 142 and the stack valve 24.

The heat recovered in the regenerator 100 from these blast gases is used subsequently for superheating steam used in conjunction with the gas-making run. Steam enters the regenerator 100 through the conduit 136, and the resultant superheated steam enters the generator tangentially through the conduit 102.

Heat regenerated from the blast gases may also be used for preheating blast air in addition to superheating process steam. To accomplish this, air may be introduced into the regenerator 100 through the conduit 124 and, after being preheated therein, flows through conduit 126 to the conduit 104, and is distributed to the generator in the manner previously described.

Valve 103 is closed during this period, and the blast gases flow through the carbureter and superheater, where they are burned with secondary air. During the latter part of the blast cycle, the preheating of the air may be discontinued and cold air introduced through conduit 46 for completing the blasting operation in the uppermost of the highly-heated refractory screen. The resultant blast gases are then burned in the regenerator 100. If desired, this cold air blast may be employed in the first part of the blast cycle, and the preheated air blast then used in the latter part of the said cycle.

In the event it is desired to employ preheated air throughout the blast cycle,—air is introduced into the system, in alternate blast cycles, respectively through line 124 leading to the regenerator 100 and through the air line 160 at the top of the superheater 16. In either case, the preheated air flows directly to conduit 104 and thence into the generator in the manner described. The blast gases flow from the generator then to the regenerator or to the carbureter or superheater as the case may be.

When using apparatus of the character shown in Fig. 2, the rich gases produced in the reverse gas-making cycle are preferably withdrawn from the top of the generator and flow through the regenerator and conduit 150 to the wash box. However they can be withdrawn directly from the generator through lines 158 and 150; or—when a down-run is used,—through lines 156 and 150.

In the interest of uniformly heating the refractory screens, the blast cycle can be split,—one portion thereof consisting of a progressive blasting operation progressing upwardly through the screens in the manner described,—either followed or preceded by a similar operation progressing downwardly, after which the gas-making cycle is begun.

For flexibility of control of the process, it is preferable to operate with refractory screens designed to catch more carbon than is necessary for heat-development purposes, with a minimum of resistance to gas flow. This is greatly facilitated by the use of progressive upward blast stages of the character described. Unevenly heated refractory screens resulting from the use of a single up-blast directed from below the grate of a generator invariably fail to catch a sufficient amount of carbon to insure flexibility of operation and the efficient production of a uniform gas of selected heating value and specific gravity.

In the practice of the invention as above described, the oil gas or oil gas-water gas mixture produced in the generator will have a heating value within the range from around 400 B. t. u. per cubic foot to 700 or more B. t. u. per cubic foot, depending upon the conditions of operation. The specific gravity of the combustible gases will generally range from .25 to .4 in accordance with the extent of the oil cracking in the generator.

For the purpose of still further increasing the gas-making capacity of the generator, and for producing a combustible gas of a higher specific gravity than .45, the blast cycle previously described may be modified in the following manner: The first portion of the blast gases is conducted unburned through the generator, carbureter and superheater, and thence through the wash box to storage. During this period no secondary air is employed either in the top of the generator or in the carbureter. After the desired portion of the blast gases has been conducted to the gasholder, the valve 19 is closed and the stack valve 24 is opened. The up-blast through the refractory screen or screens is continued now, with secondary air being introduced into the generator through conduit 58, and into the carbureter through conduit 56. In this manner sufficient heat is developed to bring the generator, carbureter and superheater to the high temperatures required for the subsequent gas-making cycle or cycles. Following completion of the up-blast cycle, a down-stream purge is carried out in the manner already described. The stored portion of the blast gases is then admixed with the oil gas made in the subsequent gas-making cycle.

The previously described forward gas-making run may in part be replaced or may be followed by an up-gas making run through the generator in the nature of a reverse run. In employing such reverse run in conjunction with the forward gas making run, the valve 19 is closed; and steam is introduced into the superheater 16 through the conduit 70.

The steam is superheated in passing through the superheater and carbureter, no carburant being introduced into the latter during this stage of operation.

The superheated steam reacts with any carbon deposited in the carbureter during the preceding forward gas-making run. Water gas is thus formed, with the removal of the carbon, and flows with the excess superheated steam into the generator and passes upwardly through the carbon held by the highly heated refractory screens in the generator, producing water-gas which then flows through conduits 96 and 92 to the wash box. The short reverse run thus clears the carbureter of carbon and insures against overheating the former.

Should it be desired to employ a reverse run in the nature of a down-run through the refractory screens, valves 12 and 94 are opened, and valves 44 and 98 are closed, the gas produced in the generator then flowing therefrom through conduit 92 to the wash box.

In the ordinary practice of the invention, oil and steam are simultaneously introduced into the generator during the gas-making run in amounts which preferably approximate .3 to .6 of a pound of steam per pound of oil. Vapors therefrom are efficiently decomposed in the generator to produce gases having heating values in the neighborhood of 400 to 700 B. t. u. per cubic foot, and a specific gravity of around .25, where the blasting operation has been conducted in a manner to raise the temperature of the refractory screens to from 1850° to 3000° F. and the lower screen to at least 1850° to 2000° F. The temperature in the screen 30 is preferably not below 2000° F. for most efficient operation.

This generator gas is carbureted in the carbureter under conditions readily obtainable therein to produce a combustible gas having a preselected heating value ranging from below 500 to 1000 or more B. t. u. per cubic foot, and a specific gravity of around .65 or below as desired.

Instead of successively blasting air into each of the superposed refractory screens in the blasting cycle, it is possible to simultaneously blast two or more thereof, limiting the amounts of air introduced into each screen to approximately that which, taken in conjunction with the air in the gases flowing from the next preceding screen will consume approximately all or a major portion of the carbon on that screen for the production of heat.

In practice it has been found desirable to introduce not over one half of the total air into the generator below the grate,—the balance being introduced between two or more of the refractory generator screens. Where the lowermost screen is shallow, less than one third of the total blast air may be passed therethrough. This air may be preheated.

By the term "progressively blasting" as used in the claims, I refer to the successive blasting of a generator bed or screen in a single direction, either upward or downward, in which the first blast flows through the entire generator bed, and in which each successive blast flows through successively smaller portions of the generator bed in the manner herein described.

The invention is susceptible to modification within the scope of the appended claims.

I claim:

1. In a cyclic process for making combustible gas wherein during a gas make period hydrocarbons are cracked by passing the same downwardly through a relatively deep carbon-filtering bed of highly heated ceramic pieces, with resultant production of hydrocarbon gas and deposition of carbon on the surfaces of the ceramic pieces which carbon is burned during a subsequent air blast period, the steps of blasting air in series through two vertically separate zones of the ceramic bed between make periods in controlled amount approximately sufficient to consume the carbon in the zone of the bed first contacted by the air, suspending the first air blast and blasting additional air through the second zone of the bed only in amount sufficient to consume at least the major portion of the carbon remaining therein, thus rapidly heating each zone of the bed to a high gas-making temperature.

2. In a cyclic process for making combustible gas wherein during a gas make period hydrocarbons are cracked and carbon produced during cracking is separated from gas by passing the latter downwardly through a relatively deep carbon-filtering bed of relatively small ceramic pieces, with resultant deposition of carbon on the surfaces of the ceramic pieces which carbon is burned during a subsequent blast period, the steps of blasting a combustion supporting gas in series through two vertically separate portions of the ceramic bed between make periods, suspending the first blast and blasting additional combustion supporting gas through that portion of the bed last contacted by the first blast, and adjusting the amount of combustion supporting gas passing through the respective portions of the said bed substantially in accordance with the amount of carbon held thereby.

3. In a cyclic process for making combustible gas wherein during a gas make period hydrocarbons are cracked by passing the same downwardly through a relatively deep carbon-filtering bed of highly heated ceramic pieces, with resultant deposition of carbon on the surfaces of the ceramic pieces which carbon is burned during a subsequent air blast period, the steps of blasting air upwardly through the lowermost of two vertically separate zones of the ceramic bed in amount approximately sufficient to consume the carbon in the lowermost zone, withdrawing the resultant gases through the uppermost zone, and thereafter discontinuing the blast of air through the lowermost zone and blasting air upwardly through the uppermost zone of the bed only in amount sufficient to consume at least the major portion of the remaining carbon therein, thus rapidly heating each section of the bed to a uniform high gas making temperature.

4. In a cyclic process for making combustible gas wherein during a gas make period hydrocarbons are cracked by passing the same downwardly through a relatively deep carbon-filtering bed of highly heated ceramic pieces, with resultant deposition of carbon on the surfaces of the ceramic pieces which carbon is burned during a subsequent air blast cycle, the steps of blasting air through a plurality of vertically separate zones of the ceramic bed in a plurality of successive stages, flowing the air through each of the said zones of the bed during the first of the said stages, and flowing the air in each successive stage thereafter through successively fewer of the said zones, thereby consuming the carbon carried by the bed and heating the latter uniformly to high gas making temperature with the production of blast gases.

5. Apparatus adapted for the cracking of hydrocarbons comprising a gas generator, a plurality of vertically spaced carbon-filtering refractory screens each upwards of one foot in depth supported within the generator, each of said screens comprising a body of loosely packed substantially uniformly sized relatively small ceramic pieces, a plurality of independent valve controlled means for separately introducing air to the generator at points respectively below the lowermost screen, above the uppermost screen, and between each of the refractory screens, means for controlledly spraying hydrocarbon fluid upon the uppermost screen, and separate valve controlled gas offtakes for removing gas from the top of the generator and from the base of the generator.

6. Apparatus adapted for the cracking of hydrocarbons comprising a gas generator, a carbon filtering refractory screen upwards of two feet in depth supported within the generator, said screen comprising a two-sectioned bed of which the lowermost section consists of a body of loosely packed substantially uniformly sized relatively small ceramic pieces and the uppermost section consists of another body of substantially uniformly sized ceramic pieces of somewhat larger size than those making up the lowermost section, independent valve-controlled means for separately introducing air to the generator at points respectively above and below the refractory screen, means for controlledly spraying hydrocarbon fluid downwardly upon the top of the screen, and separate gas offtakes for removing gas from the top of the generator and from the base of the generator.

7. Apparatus adapted for the cracking of hydrocarbons comprising a gas generator, a carbon filtering refractory screen upwards of two feet in depth supported within the generator, said screen comprising a body of loosely packed substantially uniformly sized relatively small high-alumina bricks of three quarter inch—one and one half inch linear dimensions adapted to withstand temperatures of 1850° F. to 3000° F., independent valve-controlled means for separately introducing air to the generator at points respectively above and below the refractory screen, means for controlledly spraying hydrocarbon fluid downwardly upon the screen, and separate gas offtakes for removing gas from the top of the generator and from the base of the generator.

ALFRED JOHNSON.